April 6, 1965  E. TRONNIER ETAL  3,176,582
THREE LENS PHOTOGRAPHIC OBJECTIVE
Filed Aug. 25, 1960
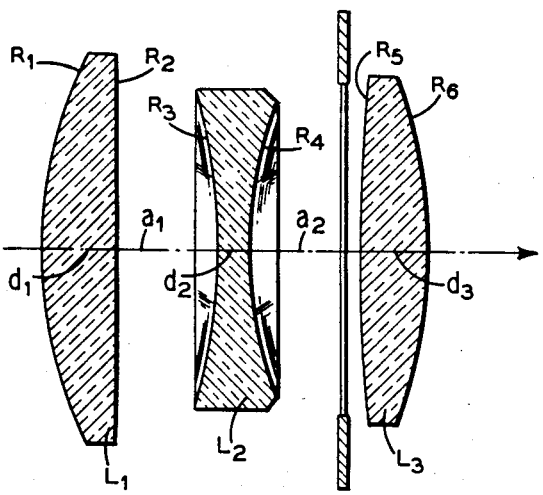
INVENTORS
Ernst Tronnier
Joachim Eggert
BY
ATTORNEYS

United States Patent Office 3,176,582
Patented Apr. 6, 1965

3,176,582
THREE LENS PHOTOGRAPHIC OBJECTIVE
Ernst Tronnier and Joachim Eggert, Braunschweig, Germany, assignors to Voigtlander A.G., Braunschweig, Germany, a corporation of Germany
Filed Aug. 25, 1960, Ser. No. 51,883
Claims priority, application Germany, Jan. 11, 1960, V 11,146
1 Claim. (Cl. 88—57)

This invention relates to objectives or lens systems for photographic cameras, projectors, and the like and, more particularly, to an inexpensive lens system or objective consisting of three independent coaxial and axially spaced lenses, which is fully corrected with respect to optical aberrations, and which, at a relatively large diaphragm aperture, covers a relatively wide field having a diameter approximately 90 percent of the focal length of the objective.

Prior known objectives of this type have included three lenses, the intermediate lens being a divergent lens and the two outer lenses being convergent lenses. By forming both convergent lenses of lanthanum glasses of high refraction, there is obtainable a very substantial correction of such optical defaults as spherical aberration, coma, and curvature of the field. Substantial correction for other optical aberrations, such as astigmatism, distortion, and chromatic aberrations, is also obtained. However, the use of the lanthanum glasses for the convergent lenses results in a relatively expensive objective or lens system.

The present invention is directed to an improvement in such lens system or objectives wherein, with only one of the convergent lenses comprising lanthanum glass of high refraction, and by the use of particular relations between the axial air spacing and relative physical properties of the three lenses, there is obtained an objective or lens system which has properties substantially equivalent to that of objectives or lens systems of the same type in which both convergent lenses are of highly refractive lanthanum glasses.

More particularly, in accordance with the present invention, the lens system or objective has certain critical relations and characteristics of its components. First, the overall length of the objective is between 30 percent and 45 percent of its total focal length, the refractive indices of the glasses used for the lenses are within the range of 1.65 and 1.75, and the difference between the arithmetic means of the refractive indices of the convergent lenses and the refractive index of the negative or divergent lens is between −0.01 and +0.01.

In addition, the objective or lens system of the present invention has the following critical characteristics and relations:

(a) The refractive indices of the three lenses progressively increase in the direction of light through the objective from the side of the longer conjugate to the side of the shorter conjugate.

(b) The last lens in this direction of light passing through the objective, referred to as the rear lens, is made of a glass having a refractive index greater than 1.67 and an Abbe value greater than 45.

(c) The ratio of the radius of curvature ($R_4$) of the rear surface of the intermediate negative or divergent lens, which is the surface adjacent the diaphragm, to the radius of curvature ($R_1$) of the front surface of the first lens in such direction of light passing through the objective, referred to as the front lens, is between 1.05 and 0.9; or $$1.05 > \frac{R_4}{R_1} > 0.9$$

(d) The ratio of the length ($a_1$) of the air space between the convergent front lens and the intermediate divergent lens to the length ($a_2$) of the air space between said intermediate diverging lens and the convergent rear lens is between 1.1 and 0.85; or $$1.1 > \frac{a_1}{a_2} > 0.85$$

Particularly advantageous results are obtained if a lens system or objective, having the foregoing characteristics and relations includes an intermediate negative or divergent lens in which the absolute value of the ratio of the radius of curvature ($R_4$) of the rear surface to the radius of curvature ($R_3$) of the front surface falls between 0.63 and 0.70; or $$0.63 < \left|\frac{R_4}{R_3}\right| < 0.70$$

It is also advantageous, for best optical results, that the ratio of the radius of curvature ($R_1$) of the front surface of the convergent front lens to the radius of curvature ($R_2$) of the rear surface thereof falls between −0.05 and +0.05; or $$-0.05 < \frac{R_1}{R_2} < +0.05$$

which therefore can be written $$0 < \pm\frac{R_1}{R_2} < 0.05$$

Further improvement in optical results is obtained if the absolute value of the ratio of the radius of curvature ($R_6$) of the rear surface of the convergent rear lens to the radius of curvature ($R_5$) of the front surface thereof falls between 0.20 and 0.30; or $$0.20 < \left|\frac{R_6}{R_5}\right| < 0.30$$

Finally, for best results, the ratio of the axial thickness ($d_1$) of the convergent front lens to the axial thickness ($d_3$) of the convergent rear lens is preferably between 1.15 and 0.9, with the ratio of the sum of the axial thicknesses of all lenses to the overall physical length ($l$) of the three lens objective being less than 0.5; or $$1.15 > \frac{d_1}{d_3} > 0.9$$

and $$\frac{d_1+d_2+d_3}{l} < 0.5.$$

An objective possessing the foregoing characteristics and relations, while not limited to such use, is particularly suitable for photographing still pictures, and is particularly adaptable for use with an objective focal length of about 50 mm. in miniature cameras taking pictures having a size of 24 x 36 mm., and when so used the relative diaphragm aperture can be increased to 1:2.8. Experiments have indicated that the image performance of the invention objective, in this case, and even at full diaphragm opening, meets the increased standards demanded in modern miniature picture photographing.

For an understanding of the invention principles, reference is made to the following description of a typical embodiment thereof as illustrated in the accompanying drawings, in which the single figure represents a lens embodying the present invention.

For the purpose of providing a specific example of an objective or lens system embodying the invention and with reference to the lens system or objective shown in the drawing, the following table gives a set of physical values applicable to this particular example, based, for convenience, upon a focal length of 100 mm. However, it should be understood that this specific example is by no means limiting, and that the invention may be embodied in lens systems or objectives having optical data differing from those of the specific example but falling within the scope of the appended claim.

Numerical example

[$f=100$ mm. Relative aperture 1:2.8. Field angle 47°]

LENS $L_1$

| $R_1 = +42.81$ mm. | $d_1 = 7.476$ mm. | $n_1 = 1.65844$ | $\nu_1 = 50.84$ |
|---|---|---|---|
| $R_2 = -7,013.04$ mm. | $a_1 = 10.241$ mm. | | |

LENS $L_2$

| $R_3 = -60.91$ mm. | $d_2 = 2.969$ mm. | $n_2 = 1.67270$ | $\nu_2 = 32.23$ |
|---|---|---|---|
| $R_4 = +41.27$ mm. | $a_2 = 11.265$ mm. | | |

LENS $L_3$

| $R_5 = +167.23$ mm. | $d_3 = 6.799$ mm. | $n_3 = 1.6910$ | $\nu_3 = 54.80$ |
|---|---|---|---|
| $R_6 = -47.56$ mm. | | | |

In the table, L indicates the lenses, R the radii of the lens surface, d the axial thicknesses of the lenses, a the air spaces between the lenses, n the refractive index for the yellow helium line ($\lambda = 587.6$ mm.), and $\nu$ the Abbe number of the glass in question.

The overall physical length of the objective $$(l = d_1 + a_1 + d_2 + a_2 + d_3)$$

is $l = 38.750$ mm. and thus is between 30 and 45% of the total focal length of $f = 100$ mm. The indices of refraction $n_1$, $n_2$ and $n_3$ are all in the range of 1.65 to 1.75. The arithmetic mean of the refractive indices $n_1$ and $n_3$ of the convergent lenses $L_1$ and $L_3$ is $$\frac{n_1 + n_3}{2}, \text{ i.e. } n_1 = 1.65844 + \frac{n_3 = 1.6910}{3.34944} \div 2 = 1.67472$$

and the difference between this mean value and the refractive index $n_2$ of the negative lens $L_2$ is $$\begin{array}{r}1.67472\\-1.67270\\\hline+0.00202\end{array}$$

which is thus between the values $-0.01$ and $+0.01$.

The lens system or objective according to the above table has the first four critical characteristics mentioned above, as follows:

(a) The refractive indices of the lenses $L_1$, $L_2$, $L_3$, namely:

$$n_1 = 1.65844$$
$$n_2 = 1.67270$$
$$n_3 = 1.6910$$

increase in the direction of the light through the lens system from the side of the longer conjugate to the side of the shorter conjugate.

(b) The refractive index $n_3 = 1.6910$ of lens $L_3$ is greater than 1.67, and its Abbe number $\nu_3 = 54.80$ is greater than 45.

(c) The ratio of the radius $R_4$ of the intermediate negative lens $L_2$ to the radius $R_1$ of the positive outer lens $L_1$, namely:

$$\frac{R_4 = +41.27}{R_1 = +42.81} = +0.9640$$

lies between 1.05 and 0.9.

(d) The ratio of the air space $a_1$ to the air space $a_2$ is $$\frac{a_1 = 10.241}{a_2 = 11.265} = 0.9091$$

and this value is between 1.1 and 0.85.

The lens system or objective illustrated in the drawings and having the physical characteristics and relations set forth in the foregoing table also has the other characteristics and relations set forth above, as follows:

In the case of the negative lens $L_2$, the radius $$R_4 = +41.27 \text{ mm.}$$

and the radius $R_3 = -60.91$ mm.; the ratio of $R_4/R_3$ is therefore $-0.6776$, the absolute value of which is thus between 0.63 and 0.70.

The ratio of the radii of the front or outer lens $L_1$, namely $R_1 = +42.81$ mm. and $R_2 = -7013.04$ mm., is $$\frac{R_1}{R_2} = -0.00610$$

which is between $-0.05$ and $+0.05$. It may be pointed out here that, in this example, the lens $L_1$ is a biconvex lens. This condition would also be fulfilled if, instead of a biconvex lens, a planoconvex lens or a positive meniscus were used as the front lens of the system.

In accordance with the above table, furthermore, the rear lens $L_3$ has radii $R_6 = -47.56$ mm. and $R_5 = +167.23$ mm., whose ratio $$\frac{R_6}{R_5} = -0.2844$$

the absolute value of which is between 0.20 and 0.30.

Also, the ratio of the axial thicknesses $d_1 = 7.476$ mm. of lens $L_1$ and $d_3 = 6.799$ mm. of lens $L_3$ is $$\frac{d_1}{d_3} = 1.0996$$

This is thus between 1.15 and 0.9. At the same time, in this connection, the sum of all three axial thicknesses $(d_1 + d_2 + d_3)$ of the three lenses $L_1$, $L_2$, $L_3$, of the system, namely 17.244 mm., is smaller than half the structural length $l = 38.750$ mm. of the entire objective, i.e. smaller than 19.375 mm.

While a specific embodiment of the invention has been shown and described in detail to illustrate the application of the principles of the invention, it will be understood that the invention may be embodied otherwise without departing from such principles.

What is claimed is:

A photographic objective consisting of three serially arranged coaxial and axially spaced lenses including, in the direction of light rays entering the objective from the side of the longer conjugate toward the side of the shorter conjugate, a convergent front lens, an intermediate divergent lens, and a convergent rear lens; only said convergent rear lens being formed of lanthanum glass, and the refractive indices of the several lenses increasing uniformly in such direction of light; and wherein, with reference to an objective having a focal length of 100 mm., the radius of curvature ($R_1$) of the front surface of the front lens is $+42.81$ mm., the radius of curvature ($R_2$) of its rear surface is $-7013.04$ mm., its axial thickness ($d_1$) is 7.476 mm., its refractive index ($n_1$) is 1.65844, and its Abbe number is 50.84; the axial length ($a_1$) of the air space between the front lens and the intermediate lens is 10.241 mm., the radius of curvature ($R_3$) of the front surface of the intermediate lens is $-60.91$ mm., the radius of curvature ($R_4$) of its rear surface is $+41.27$ mm., its axial thickness ($d_2$) is 2.969 mm., its refractive index ($n_2$) is 1.67270, and its Abbe number is 32.23; the axial length ($a_2$) of the air space between the intermediate lens and the rear lens is 11.265 mm.; and the radius of curvature ($R_5$) of the front surface of the rear lens is $+167.23$ mm., the radius of curvature ($R_6$) of its rear surface is $-47.56$ mm., its axial thickness ($d_3$) is 6.799 mm., its refractive index ($n_3$) is 1.6910, and its Abbe number is 54.80; or, expressed mathematically:

$$l = d_1 + a_1 + d_2 + a_2 + d_3 = 38.750 \text{ mm.}$$

which is between 30% and 45% of $f = 100$ mm.;

$$\begin{array}{r} n_1 = 1.65844 \\ + n_3 = 1.6910 \\ \hline \dfrac{3.34944}{2} = 1.67472 \\ \\ 1.67472 \\ - n_2 = 1.67270 \\ \hline .00202 \end{array}$$

which is between $-0.01$ and $+0.01$;

$$\frac{R_4}{R_1} = \frac{+41.27 \text{ mm.}}{+42.81 \text{ mm.}} = 0.9640$$

which is between 1.05 and 0.9;

$$\frac{a_1}{a_2} = \frac{10.241 \text{ mm.}}{11.265 \text{ mm.}} = 0.9091$$

which is between 1.1 and 0.85;

$$\frac{R_4}{R_3} = \frac{+41.27 \text{ mm.}}{-60.91 \text{ mm.}} = -0.6776$$

and the absolute value is thus between 0.63 and 0.70;

$$\frac{R_1}{R_2} = \frac{+42.81 \text{ mm.}}{-7013.04 \text{ mm.}} = -0.00610$$

and this is between $-0.05$ and $+0.05$;

$$\frac{R_6}{R_5} = \frac{-47.56 \text{ mm.}}{+167.23 \text{ mm.}} = -0.2844$$

and the absolute value of this is between 0.20 and 0.30;

$$\frac{d_1}{d_3} = \frac{7.476 \text{ mm.}}{6.799 \text{ mm.}} = 1.0996$$

which is between 1.15 and 0.9.

References Cited by the Examiner
UNITED STATES PATENTS

| | | | |
|---|---|---|---|
| 2,818,777 | 1/58 | Hudson et al. | 88—57 |
| 3,006,249 | 10/61 | Mandler | 88—57 |

JEWELL H. PEDERSEN, *Primary Examiner.*
EMILE G. ANDERSON, WILLIAM MISIEK,
*Examiners.*